United States Patent Office 3,258,481
Patented June 28, 1966

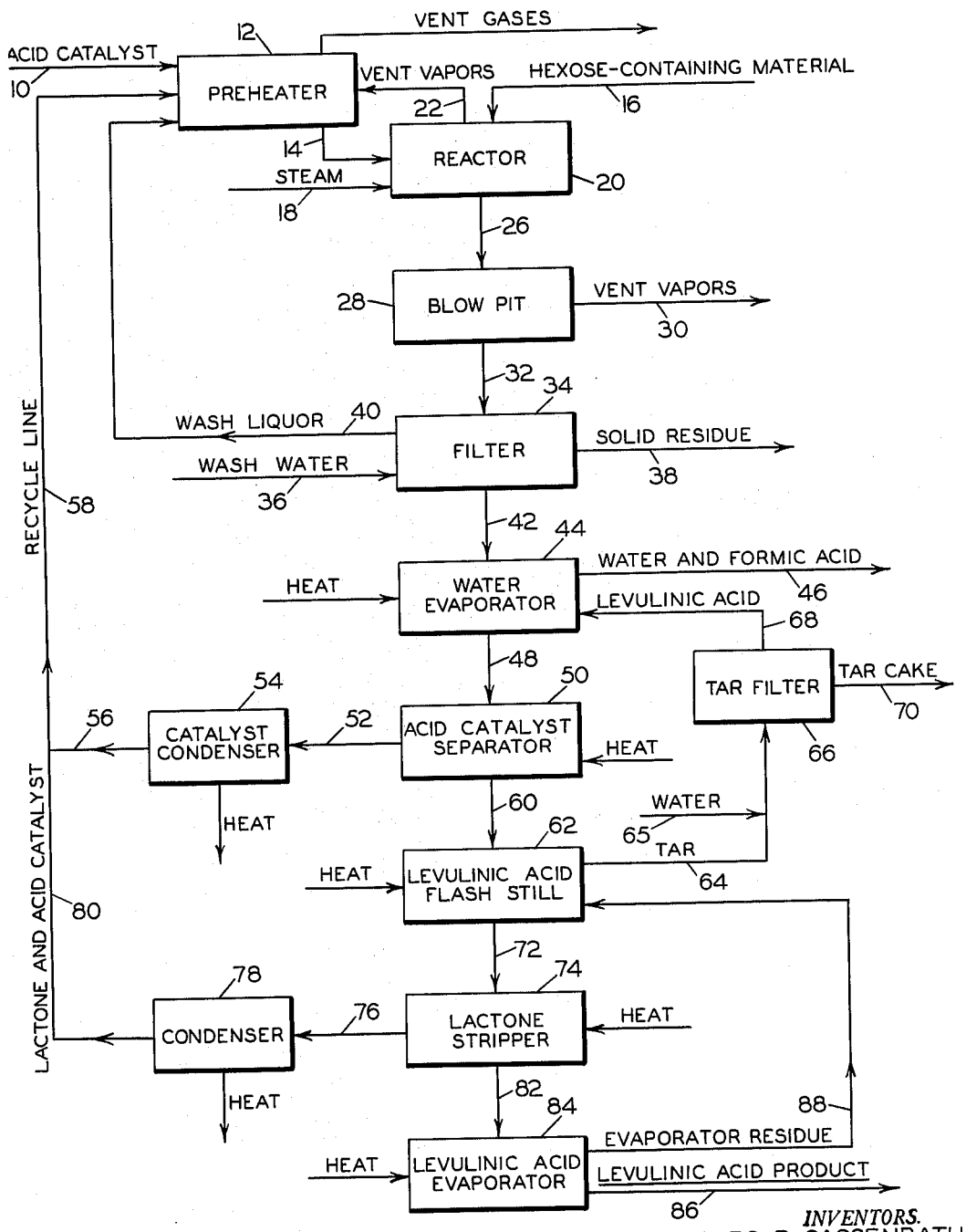

3,258,481
PREPARATION OF LEVULINIC ACID FROM
HEXOSE-CONTAINING MATERIAL
Charles P. Sassenrath, Pasadena, Calif., and Wilbur L.
Shilling, Camas, Wash., assignors to Crown Zellerbach
Corporation, San Francisco, Calif., a corporation of
Nevada
Filed Mar. 21, 1962, Ser. No. 181,271
2 Claims. (Cl. 260—528)

This invention relates to an improved process for producing levulinic acid and has for an object the provision of an economically feasible commercial process for producing this substance.

Several processes have been proposed in the past for the production of levulinic acid which involve the steps of digesting a carbohydrate material with an acid catalyst under certain temperatures and pressures for a suitable reaction rate to produce levulinic acid. In such processes a relatively low yield of levulinic acid has been produced due to conversion of a certain portion of levulinic acid to lactones and, furthermore, the presence of the lactones in admixture with levulinic acid has caused an undesirable darkening of the levulinic acid product. In the early stages of such processes, a solid residue is filtered out and washed with water which results in a wash liquor containing levulinic acid, the acid catalyst, and tars. This wash liquor then is added to the filtrate liquor causing undesirable dilution thereof, thereby reducing the yield of levulinic acid product and increasing the over-all cost of the process.

Accordingly, it is the main object of this invention to provide a process for the production of levulinic acid wherein levulinic acid of high purity and light color is produced in high yield by recovery and recycling of the lactones.

A further object of this invention is to provide a process for the production of levulinic acid wherein the wash liquor is recycled in order to obtain a more concentrated solution of levulinic acid and higher yield of the levulinic acid product.

Another object of this invention is to provide a process for making levulinic acid using a volatile acid catalyst, wherein substantially all of the acid catalyst is recovered and recycled, thus resulting in a higher yield of the levulinic acid product and a substantial reduction of the amount of the fresh acid catalyst required for the reaction.

Further and additional objects will appear from the following description and appended claims.

The accompanying drawing is that of a flow diagram illustrating a preferred embodiment of this invention. Reference is made hereto in the following description.

In a batch or a continuous process for producing levulinic acid, an aqueous solution of a strong acid catalyst is discharged through line 10 to a preheating zone 12 and preheated at about 80° C. to 110° C. at an autogenous pressure. Exemplary of the acid catalysts suitable in the process of this invention are: hydrochloric acid, sulfuric acid, phosphoric acid, paratoluenesulfonic acid, and hydrobromic acid. From 2 to 15 parts by weight of the aqueous solution of the catalyst is then fed through line 14 to a reaction zone 20 and is reacted with 1 part by weight of a hexose-containing material, such as bagasse, wood sawdust, waste paper, starch, corncobs, sucrose, or molasses, which is fed to the reaction zone through line 16. The ratio between the acid catalyst and hexose in the hexose-containing material in the reaction zone is at least 1 part by weight of the acid to 100 parts by weight of hexose in the hexose-containing material, preferably 5–30 parts to 100 parts, respectively. The acid catalyst concentration in the reaction zone is at least 0.5%, preferably from about 1% to 5% by weight, based on the liquid portion of the reaction mass. The acid concentration may be varied depending on the type of hexose-containing material used and on the desired rate of reaction. The reaction time ranges between 1 second and 3 hours depending on the other process variables, the reaction time being inversely proportional to the temperature and the acid catalyst concentration.

To start the reaction heat is supplied to the reaction zone 20 through the steam line 18. The reaction being exothermic, once started it produces sufficient heat for the duration of the reaction. The reaction is carried out at 150° C. to 250° C., preferably between 170° C. and 210° C. under autogenous pressure. After the reaction is complete, the temperature of the reacted mass may be reduced to about 90° C.–120° C. The exothermic heat created in the reaction zone 20 causes generation of vapors which include steam and a portion of the acid catalyst. These vapors are vented and passed through line 22 to the preheating zone 12, resulting in a proper control of the temperature and pressure during and after the reaction, recovery of a portion of the acid catalyst, and preheating the aqueous solution of the acid catalyst thereby reducing the quantity of heat supplied through line 18 to the reaction zone 20.

The reacted mixture includes levulinic acid, acid catalyst, tars, solid residue, formic acid, and water. This reacted mass is then discharged through line 26 to a low pressure zone, such as blow pit 28, wherein the pressure is lower than that in the reaction zone, to flash off through line 30 some of the undesirable components of the reacted mass, such as noncondensible vapors. The reacted mass is then fed through line 32 to a filtration zone 34 to separate the solid residue which is discharged through line 38 and to discharge the resulting hydrolysate liquor, i.e. the liquid mixture resulting from the separation of the solid residue, through line 42 to a water evaporation zone 44.

The solid residue is washed with water fed through line 36 and the resulting wash liquor, which contains a portion of the acid catalyst, tars, and levulinic acid, is recycled through line 40 to the preheating zone 12. The wash liquor may be recycled to the reaction zone 20 if desired. The recycling of the wash liquor to the preheating zone produces a dilution of the reacting components in the reaction zone 20 without the use of an undue amount of fresh water. The more dilute the mixture is in the reaction zone the more levulinic acid is formed, therefore, a higher levulinic acid yield is obtained. However, if this dilution is achieved with fresh water alone, it results in greater cost in evaporating the water from the mixture and more costly equipment for levulinic acid distillation in later stages of the process. The water evaporation heat economy realized by this process step may range from 20% to 80% depending on the type of hexose-containing feed, and if the operation requires a solvent to extract levulinic acid, there is also a saving in the required quantity of the solvent. Due to recycling of the wash liquor through line 40 to the preheating zone 12 the tars contained therein pass trough the reaction zone 20 again and thus are subjected to more heat which converts them to a solid residue which is filtered out through line 38. In this manner, the amount of tars admixed with the hydrolysate liquor flowing through line 42 is reduced, thereby preventing a loss of a portion of levulinic acid admixed with the tars which are filtered out through line 70. The recycling of the wash liquor also allows the dilution of the reaction mixture to a desired liquor to solids ratio with lesser amount of fresh water, thereby increasing the fluidity of the reaction mass.

The increased fluidity results in a better contact between the particles of the hexose-containing material and the acid catalysts in the reaction zone 20 and thus in a more uniform heat distribution and a higher levulinic acid yield.

The hydrolysate liquor is discharged through line 42 to a water evaporating zone 44 where water and formic acid are evaporated therefrom through line 46. The resulting liquor is fed through line 48 to an acid catalyst separating zone 50. The separation of the acid catalyst from the levulinic acid solution may be done by solvent extraction or by evaporation and distillation depending on the type of catalyst used. The acid catalyst recovered is recycled to the preheating zone 12 through line 52, a catalyst accumulator or condenser 54, line 56, and line 58. The acid catalyst recovered may be recycled to the reaction zone if desired. This step of the process recovers substantially all of the acid catalyst, together with a portion of levulinic acid which otherwise would be lost from the system. The recovery and recycling of the acid catalyst also decreases the quantity of fresh acid catalyst required for the reaction.

The residual mixture resulting from the acid catalyst separating zone 50 comprises levulinic acid, tars, and lactones which are formed in the process. This mixture is discharged through line 60 to a levulinic acid distillation zone, such as a levulinic acid flash still 62, where the tars and a portion of levulinic acid are removed through line 64 and after mixing with water through line 65 they are passed through a tar filtration zone 66 to separate out a tarry material from the portion of levulinic acid through line 70. The levulinic acid filtrate is recycled through line 68 to the water evaporating zone 44.

The fluid mixture separated in levulinic acid distillation zone 62 comprises predominantly levulinic acid and a small amount of lactones. This mixture is discharged through line 72 to a lactone distillation zone, such as a lactone stripper 74, to recover and recycle the lactones to the preheating zone 12 through line 76, condenser 78, line 80, and line 58. The lactones recovered may be recycled to the reaction zone if desired. When a volatile acid catalyst is employed, traces thereof are recovered and recycled together with the lactones. The recycling of the lactones to the preheating zone results in a higher yield of levulinic acid due to conversion of lactones to further quantities of levulinic acid. It also removes one of the basic causes of darkening of the levulinic acid product due to polymerization of lactones in the course of the process.

The resulting solution from lactone distillation zone 74 is discharged through line 82 to a levulinic acid distillation zone, such as a levulinic acid evaporator 84, to separate through line 86 a substantially pure light-colored levulinic acid product from a residue which is recycled through line 88 to levulinic acid distillation zone 62.

The present invention is further illustrated by the following specific examples which are not intended to limit the scope thereof.

*Example 1*

834 pounds of fir sawdust containing 50% hexose, oven-dry basis, and having 50% moisture content were placed in a suitable reactor. To this wood sawdust charge there was added a hydrochloric acid solution preheated in a preheater at about 100° C. The ratio of the acid solution to the oven-dry sawdust was 4 to 1 and the solution contained 1.5% hydrochloric acid. Thus the ratio of hydrochloric acid to the hexose in the sawdust was 12 to 100. The mixture of the sawdust and the acid solution in the reactor was heated under autogenous pressure to a temperature of about 190° C. and maintained at that temperature for about 30 minutes. Vapors produced in the reactor were vented to the preheater. Water was applied to wash and remove residual levulinic acid and hydrochloric acid from a solid residue formed in the reactor. The wash liquor resulting from the application of the wash water to the solid residue contained 26 pounds of levulinic acid and 6 pounds of hydrochloric acid which were recycled to the preheater. Hydorchloric acid in the amount of 13.5 pounds together with 4 pounds of levulinic acid, recovered in a hydrochloric acid evaporator and in a lactone stripper, were also recycled to the preheater. A total of 3 pounds of lactones recovered in the lactone stripper was also recycled to the preheater. Under these conditions there was produced 75 pounds of light yellow levulinic acid product having a purity of 99% corresponding to a yield of 36% of levulinic acid based upon the weight of the hexose in the sawdust placed in the reactor.

*Example 2*

In this example 400 pounds of sugarcane bagasse containing 40% hexose, oven-dry basis, and having 25% moisture content were placed in a reactor. To this bagasse charge there was added a sulfuric acid solution preheated in a preheater at about 100° C. The ratio of the acid solution to the oven-dry bagasse was 3.6 to 1 and the solution contained 3% acid. Thus the ratio of sulfuric acid to the hexose in the bagasse was 26 to 100. The mixture of the bagasse and the acid solution in the reactor was heated under autogenous pressure to a temperature of about 200° C. and maintained at that temperature for about 5 minutes. Vapors produced in the reactor were vented to the preheater.

Water was applied to wash and remove residual levulinic acid and sulfuric acid from a solid residue formed in the reactor. The wash liquor resulting from the application of the wash water to the solid residue contained 45 pounds of levulinic acid and 14 pounds of sulfuric acid which were recycled to the preheater. In a solvent extraction system, the sulfuric acid together with traces of levulinic acid were recovered and recycled to the preheater. 2 pounds of lactones recovered in a lactone stripper were also recycled to the preheater. Under these conditions there was produced 41 pounds of light yellow levulinic acid product having a purity of 98.5% corresponding to a levulinic acid yield of 30% based upon the weight of the hexose in the bagasse placed in the reactor.

Thus from the description of the process and foregoing examples it will be apparent that by the practice of the present invention we have provided an improved and commercially feasible process in a new combination of steps for the production of levulinic acid in high yield and light color.

The process provides for recovery and recycling of lactones formed during the process, thereby increasing the yield of levulinic acid product and preventing darkening of the same. The process further provides for preheating of the acid catalyst solution by the vapors produced during the reaction. The utilization of the vapors reduces the amount of heat required for the reaction to start, and recovers a portion of the levulinic acid which otherwise would be lost. By recycling the wash liquor resulting from the application of water to the solids formed during the reaction and by recovering and recycling the acid catalyst feed, the process of this invention increases the yield of the levulinic acid product and also reduces the cost of the equipment and quantity of the fresh acid catalyst required for the process.

The foregoing disclosure is not to be considered as limiting the scope of the invention since many variations may be made by those skilled in the art without departing from the scope or spirit of the following claims. Having thus described our invention in preferred embodiments, We claim:

1. In the process of producing levulinic acid in which a hexose-containing material and a strong acid catalyst are reacted in a reaction zone to produce a reaction mixture comprising a solid residue, water, acid catalyst and levulinic acid, the levulinic acid being subsequently separated from the remainder of the reaction mixture by the steps of (a) filtering the solid residue from the reacted mixture to obtain a hydrolysate liquor, and
(b) removing the water and acid catalyst from the hydrolysate liquor, the improvement which comprises removing substantially all of said water and said acid catalyst from said hydrolysate liquor, thereafter removing lactones from the levulinic acid product by distillation, said distillation being effected in the substantial absence of water in the distillation zone, and recycling said lactones to said reaction zone.

2. The process of claim 1 wherein said acid catalyst is hydrochloric acid.

References Cited by the Examiner
UNITED STATES PATENTS

| | | | |
|---|---|---|---|
| 2,305,738 | 12/1942 | Scheving et al. | 260—528 |
| 2,780,588 | 2/1957 | Dunlop | 260—528 |
| 2,840,605 | 6/1958 | Leonard | 260—528 |
| 3,065,263 | 11/1962 | Carlson | 260—528 |

FOREIGN PATENTS 700,643 1/1941 Germany.

LORRAINE A. WEINBERGER, *Primary Examiner.*

CHARLES B. PARKER, *Examiner.*

G. P. D'ANGELO, I. R. PELLMAN,
*Assistant Examiners.*